United States Patent Office 2,933,080
Patented Apr. 19, 1960

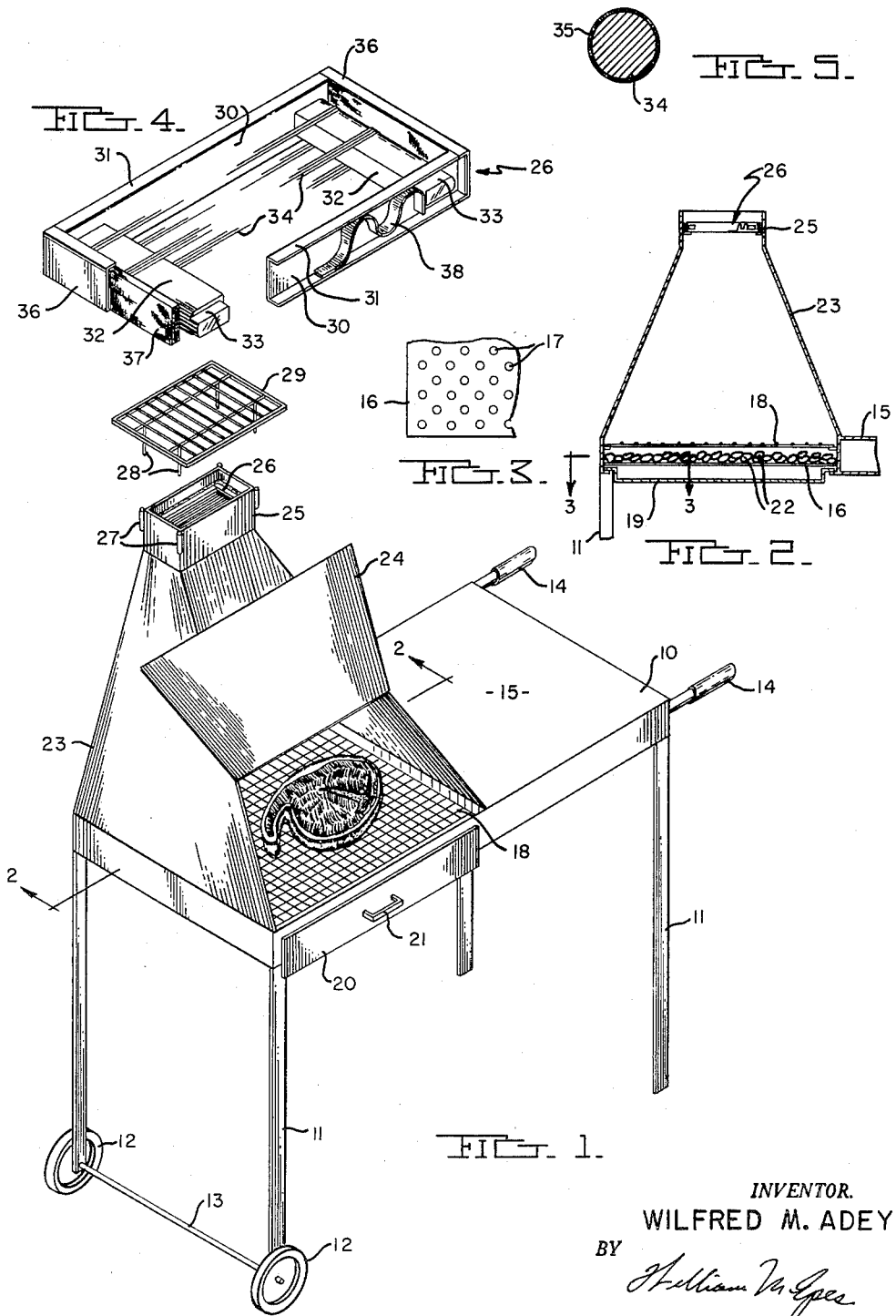

2,933,080

COOKING APPARATUS

Wilfred M. Adey, Paoli, Pa., assignor to Oxy-Catalyst, Inc., a corporation of Pennsylvania Application March 7, 1956, Serial No. 570,181

2 Claims. (Cl. 126—25)

This invention relates to cooking apparatus, particularly apparatus for broiling meat or the like, of the type in which the food is rapidly cooked at a relatively high heat with the generation of relatively large amounts of smoke and combustible vapors, and is concerned with means for carrying on such cooking operations with the elimination of the smoke and vapors in a simple but highly efficient fashion.

In some types of cooking operations, particularly in the broiling of steaks, chops, etc., it is highly desirable to expose the meat to a source of intense heat which will produce searing and so-called "charcoaling" of the outer surface of the meat, thus sealing in the natural juices and producing a crisp outer crust with the inner portion of the meat in a tender and succulent condition. Such an operation, while highly desirable, from the standpoint of producing a properly cooked steak, chop or the like has the disadvantage of also producing large amounts of smoke and acrid vapors particularly grease vapors. The effluent from the operation is so objectionable that it has been out of the question to carry on such operations indoors not only from the standpoint of physical discomfort to the occupants of the room but because of the large amounts of grease that deposit upon the walls and fixtures of the room. The volume of smoke and vapors produced is likewise highly objectionable in semi-enclosed spaces such as screened porches and even can be unpleasant out-of-doors where the operation is carried on close to the dining area.

Many suggestions have been made in the past for the elimination of such cooking fumes, such as filters for trapping the objectionable components of the effluent, or electrically heated wires for consuming the oxidizable constituents of the fumes. Filters, however, have proved ineffective and impractical since the fine particles of smoke are usually not trapped and the grease vapors, if condensed, clog up the filter requiring too frequent replacement. Electrically heated wires, if provided with a film of an oxidation catalyst, may be quite effective but are subject to the disadvantage of requiring an electrical connection. For a mobile cooking unit, such as a broiler, this can often be quite inconvenient, without considering the additional cost.

It has now been found according to the present invention that it is possible to eliminate the smoke and vapors produced by rapid cooking operations, where the food is exposed to relatively intense heat producing large amounts of such fumes, by collecting the hot effluent from the cooking operation, passing this in contact with an oxidation catalyst, and maintaining the catalyst at its activation temperature by a combination of the sensible heat contained in the cooking effluent and the heat of reaction released at the surface of the catalyst through the catalytic oxidation of the smoke and combustible vapors which pass in contact with it. In such an operation, highly efficient elimination of the smoke and vapors is effected without application of external heat to the catalyst. As will be explained in more detail subsequently, it is highly preferable to employ a catalyst constructed of a material having a heat conductivity, such as metal wires, since this type of material will heat up quickly when exposed to the sensible heat of the cooking effluent and thus quickly reach its activation temperature at which it becomes effective for the elimination of the fumes.

For a better understanding of the invention, reference is now made to the accompanying drawings in which Fig. 1 is a perspective view of an embodiment of the invention showing a portable apparatus designed primarily for the broiling of meats or the like and provided with fume elimination means in accordance with the invention.

Fig. 2 is a cross-sectional view taken on the line 2—2 of Fig. 1.

Fig. 3 is a fragmentary view of the fuel-supporting means taken on line 3—3 of Fig. 2.

Fig. 4 is a perspective view showing a preferred type of catalytic element for use in accordance with the invention.

Fig. 5 is a cross-sectional view of a metal wire provided with a catalytic film suitable for use in the catalytic element shown in Fig. 4.

Referring now to Fig. 1, the portable broiler unit shown consists of a table portion 10 supported on four legs 11, two of the legs being provided with wheels 12 mounted on shaft 13. Handles 14 permit the unit to be conveniently wheeled to any desired location.

The table 10 includes a flat working surface 15 at one end and a broiler unit at the other consisting of a perforated tray 16 (see Fig. 2) provided with perforations 17 (see Fig. 3), an open grille 18 for supporting the meat or the like above the fuel bed, and an ash collection tray 19 to collect ashes and grease drippings falling through the perforations 17 of tray 16. The ash tray 19 is provided with a flange 20 at one end having a handle 21, thus providing an ash drawer which may be conveniently withdrawn and reinserted for ash disposal and cleaning. In the embodiment shown, the burner is adapted to burn a solid fuel such as charcoal, the fuel bed being indicated by the reference numeral 22 (see Fig. 3).

Above the broiler unit a hood 23 with sides converging toward its top is provided for collection of the smoke and vapors from the cooking operation and of the hot products of combustion from the fuel bed. The hood is provided with a door 24 hinged along the top to permit access to the broiler rack so that the meat or the like may be inserted, removed and turned during the cooking operation. As may be seen, the hood is provided at the top with a short stack portion 25 which is open to provide a vent to the atmosphere for the effluents collecting in the hood. In the vent a transversely disposed catalytic unit through which the effluent may flow is provided, being designated generally by the reference number 26. As may be seen, the hood 23 provides an enclosed chamber in which the cooking operation is carried out so that the effluent from the cooking operation including both the hot combustion products from the fuel bed and the smoke and vapors from the cooking operation itself may be collected and passed through the catalyst.

Since the effluent leaving the catalyst is at a relatively high temperature, efficient use may be made of this heat by providing a cooking platform above the vent on which a pan or pot may be placed to carry on other cooking operations simultaneously such as the boiling of coffee. For this purpose, the stack portion 25 is provided with four sockets 27 attached to each corner which receive supporting legs 28 of a cooking rack 29. For the sake of clarity, the cooking rack 29 is shown in exploded relationship to the supporting sockets 27, it being understood that the legs 28 fit into the sockets when in use thus maintaining the platform in secured relationship to the stack portion 25. To prevent particles of foreign material from entering the stack portion 25 and depositing upon the catalytic unit, it is desirable to have a screen guard or the like arranged across the top of the stack portion 25 above the catalytic unit. For the purpose of clarity this screen guard is not shown in the drawings.

Reference is now made to Fig. 4 which shows in detail the catalytic unit 26. This unit, which is described and claimed in my copending application Serial Number 435,846, filed June 10, 1954, now Patent No. 2,853,368, consists of a pair of side members 30 provided with flanges 31. Side members 30 are slotted at either end to accommodate filament-supporting members 32, members 32 being provided with reduced portions 33 at each end which fit into the slots provided in the side members 30. A metal wire 34 is wound helically around filament-supporting members 32 to provide two spaced-apart planes of closely-spaced wire filaments through which the effluent from cooking operation flows. Wire 34 is provided with a thin film of an oxidation catalyst as illustrated by the cross-sectional view in Fig. 5 in which reference numeral 35 refers to the catalyst film.

End members 36 are provided which are spot welded or otherwise attached to side members 30 and together with side members 30 make up a rectangular frame. To avoid any by-passing of the effluent between end members 36 and filament-supporting members 32, packing material 37 is inserted therebetween. This packing material is preferably of a heat resistant character such as Fiberglas or asbestos.

Since the length of metal wires supported between members 32 tend to undergo thermal expansion when heated, which would result in sagging and the possibility of by-passing of some of the effluent through the gaps thus formed, means are provided to maintain the wire in a taut condition when heated. Such means comprise a pair of springs 38, mounted on inner portions of flanges 31, one such spring being provided on either side of the unit and so positioned as to bias one of the filament-supporting members 32 away from the other. In this manner the wire is kept in a taut condition at all temperatures of operation thus insuring uniform contact of the effluent with the catalytic surface of the wire.

The film of oxidation catalyst on the surface of the wire may be of any desired type which has an activation temperature not greater than about 900° F. The activation temperature of a catalyst is that temperature at which it becomes effective in catalytically oxidizing the combustible contaminants in the effluent. Below the activation temperature little or no catalytic oxidation of the contaminants will occur. With catalysts of relatively high activity as are contemplated for use in the present invention, the activation temperature should be in the range of from 500° F. to 900° F. Particularly preferred are catalytic films such as described in U.S. Patent No. 2,731,541 consisting of a film of catalytically active alumina, beryllia, or the like, ranging in thickness from approximately .0001" to .003", this film being impregnated with a small amount, for example 1% by weight, of a catalytically active metal such as platinum or palladium.

Use of catalytic structure which is comprised chiefly of metal or other material having a high heat conductivity is to be highly preferred to other types of catalytic material having relatively lower thermal conductivities. The reason for this is that the more highly conductive materials will heat up more rapidly under the influence of the sensible heat in the effluent from the cooking operation and thus attain the activation temperature of the catalyst more quickly.

It is to be understood that other types of oxidation catalysts than that described above may also be employed, the invention not being limited, in its broader aspects, to any particular type of catalyst.

In operation, the broiler illustrated in Fig. 1 is loaded with a suitable fuel such as charcoal, which is ignited and allowed to burn for sufficient length of time to provide a suitable bed of glowing coals for the broiling operation. Combustion air enters the fuel bed through perforations 17 in tray 16. During this period, the hot products of combustion from the fuel bed are collected by the upwardly converging hood and pass over the catalytically coated wires of the catalytic element 26, heating them to a temperature for example of 600° F. to 700° F. At this temperature any smoke or fumes produced during this initial combustion are also consumed to a large extent by the catalyst.

When the fuel bed is in the proper condition, the meat to be broiled is inserted through the access door 24. The rapid broiling that ensues results in burning and charring of the surface of the meat, melting and vaporization of the fat with consequent production of relatively large amounts of smoke and fat vapors. Further smoking is caused by the fat dripping into the bed of coals and burning with a smoky flame. These effluents from the broiling operation, together with the hot products of combustion from the bed of fuel are collected by the hood and pass over the catalyst wires. The fat vapors and smoke passed in contact with the catalyst wires are catalytically oxidized largely to carbon dioxide and water vapor and the effluent from the stack portion 25 accordingly is substantially smoke-free and likewise for the most part substantially free from odor and grease vapors. Oxidation of the relatively large amounts of smoke and fat vapors releases substantial quantities of heat at the surface of the catalyst through the exothermic oxidation reaction occurring and may even in some cases cause the catalyst to become incandescent. Such heating of the catalyst causes radiation of heat both upwardly and downwardly, in the latter case toward the cooking operation directly below.

It is understood of course that other types of fuel other than charcoal or other solid fuels may be employed. For example, a fuel gas such as natural gas or LPG (liquified petroleum gases) may be employed to furnish the heat required in the cooking operation. If desired, an electrical heating element of high capacity so as to produce rapid broiling may also be employed, although this reduces the mobility of the cooking unit.

If desired, in the case of a catalyst including a metallic filament such as that described above, means may also be provided for heating the metallic filament electrically in order to heat the catalyst at the end of the cooking cycle. This may be desirable for example in case a gaseous fuel is used and the fuel is turned off at the end of the cooking cycle. In some cases under these circumstances the grease drippings will continue to burn with a smoky flame while the heat normally provided by the burning fuel (which is necessary to maintain the catalyst at its activation temperature) is lacking. In such a case, activation of the catalyst by electrical heating of the wires which provide the catalyst surface may be employed to maintain the catalyst at its activation temperature. It is also to be understood, however, that during the cooking cycle itself the heat available from the burning fuel plus that liberated at the surface of the catalyst by catalytic oxidation of the smoke and vapors is sufficient to maintain the catalyst at its activation temperature without the applicaion of extraneous heat.

It is to be further understood that other modifications of the invention other than those specifically shown or discussed above are also to be included within the scope of the appended claims.

I claim:

1. Broiling apparatus for charcoal broiling of meat or the like with concomitant production of large amounts of smoke and oily vapors, comprising a broiler rack for supporting said meat or the like, fuel-burning means arranged in close proximity to said broiler rack for subjecting the underside of said meat or the like to a source of relatively intense heat, hood means having upwardly converging sides enclosing said broiler rack and fuel-burning means for collection of the products of combustion from said fuel-burning means and of the smoke and oily vapors evolved during the broiling of said meat or the like, a door in said hood means to provide access to said broiler rack, a vent in the upper portion of said hood means adjoining the upper ends of said upwardly converging sides for venting to the atmosphere said hot products of combustion and said smoke and vapors from the cooking operation, an oxidation catalyst located directly over said broiler rack in said vent transversely of said hood and adapted to oxidize said smoke and vapors, said catalyst being comprised of a metallic filament provided with a thin film of an oxidation catalyst whereby said catalyst film, by virtue of the high heat conductivity of said metallic filament, is rapidly brought to its activation temperature by exposure to the sensible heat of the effluent from the cooking operation, said catalyst being maintained at said activation temperature at which effective oxidation of said smoke and vapor takes place by the sensible heat of said combustion products and that liberated at the surface of the catalyst by catalytic oxidation of said smoke and vapors without the application of heat from extraneous sources, the heat of oxidation being directed both upwardly and downwardly, in the latter case, for subjecting the upper surface of said meat or the like to heat.

2. Apparatus in accordance with claim 1 in which a cooking platform is disposed above said vent and adapted to be heated by the hot effluent from said oxidation catalyst.

References Cited in the file of this patent

UNITED STATES PATENTS

| Number | Name | Date |
|---|---|---|
| 852 | Heermance | July 24, 1838 |
| 145,491 | Dibble | Dec. 16, 1873 |
| 162,834 | Leigh | May 4, 1875 |
| 495,507 | Miller | Apr. 18, 1893 |
| 757,864 | Frye | Apr. 19, 1904 |
| 758,433 | Flannigain | Apr. 26, 1904 |
| 1,509,674 | Koehler | Sept. 23, 1924 |
| 2,113,012 | Albrecht et al. | Apr. 5, 1938 |
| 2,211,940 | Stoner | Aug. 20, 1940 |
| 2,300,837 | Ames | Nov. 3, 1942 |
| 2,331,266 | Cramer | Oct. 5, 1943 |
| 2,658,742 | Suter et al. | Nov. 10, 1953 |
| 2,812,038 | Krueger | Nov. 5, 1957 |
| 2,815,427 | Schaefer | Dec. 3, 1957 |
| 2,850,365 | Adey et al. | Sept. 2, 1958 |
| 2,850,366 | Houdry | Sept. 2, 1958 |